R. P. JACKSON & H. M. SCHEIBE.
ELECTRIC APPARATUS.
APPLICATION FILED JAN. 21, 1909.

959,544.

Patented May 31, 1910.
2 SHEETS—SHEET 2.

WITNESSES:
Fred H Miller

INVENTORS
Ray P. Jackson
Harold M. Scheibe
BY
Shirley E. Carr
ATTORNEY

UNITED STATES PATENT OFFICE.

RAY P. JACKSON AND HAROLD M. SCHEIBE, OF WILKINSBURG, PENNSYLVANIA, ASSIGNORS TO WESTINGHOUSE ELECTRIC & MANUFACTURING COMPANY, A CORPORATION OF PENNSYLVANIA.

ELECTRIC APPARATUS.

959,544.  Specification of Letters Patent.  Patented May 31, 1910.

Application filed January 21, 1909. Serial No. 473,541.

*To all whom it may concern:*

Be it known that we, RAY P. JACKSON and HAROLD M. SCHEIBE, citizens of the United States, and residents of Wilkinsburg, in the county of Allegheny and State of Pennsylvania, have invented a new and useful Improvement in Electric Apparatus, of which the following is a specification.

Our invention relates to systems of electric current regulation and distribution, and it has special reference to such systems as embody vapor rectifiers.

One of the objects of our invention is to provide simple and effective means for automatically governing the starting and operation of vapor rectifiers.

Another object is to adapt and control the operation of rectifiers of this type for charging secondary electric batteries or accumulators.

It is a well known fact that mercury-vapor rectifying devices cease to operate if their alternating current supply circuits are broken or if the supply of energy is temporarily interrupted, from any cause. In order to avoid this great disadvantage and to render the apparatus reliable for charging storage batteries, we provide a relay switch having special operating characteristics for automatically starting the rectifying process upon the renewed application of alternating current energy to the supply circuit. Our novel relay switch is also so arranged as not to restart the rectifying process a second time when it has stopped and is restarted under predetermined conditions in the direct current circuit which is supplied from the rectifier. For example, if a mercury-vapor rectifying device is employed for charging a storage battery, our relay switch may be utilized in lieu of an attendant for automatically restarting the rectifying process upon its accidental discontinuance and for allowing the rectifying process to stop when the battery is charged to a predetermined degree. This is based on the property of the rectifier whereby it is able to operate for a short time at a current value at which continuous operation is impossible. This small current latches open the actuating circuit of the starting device so that when the bulb goes out a second time it will not be restarted.

Figure 1:
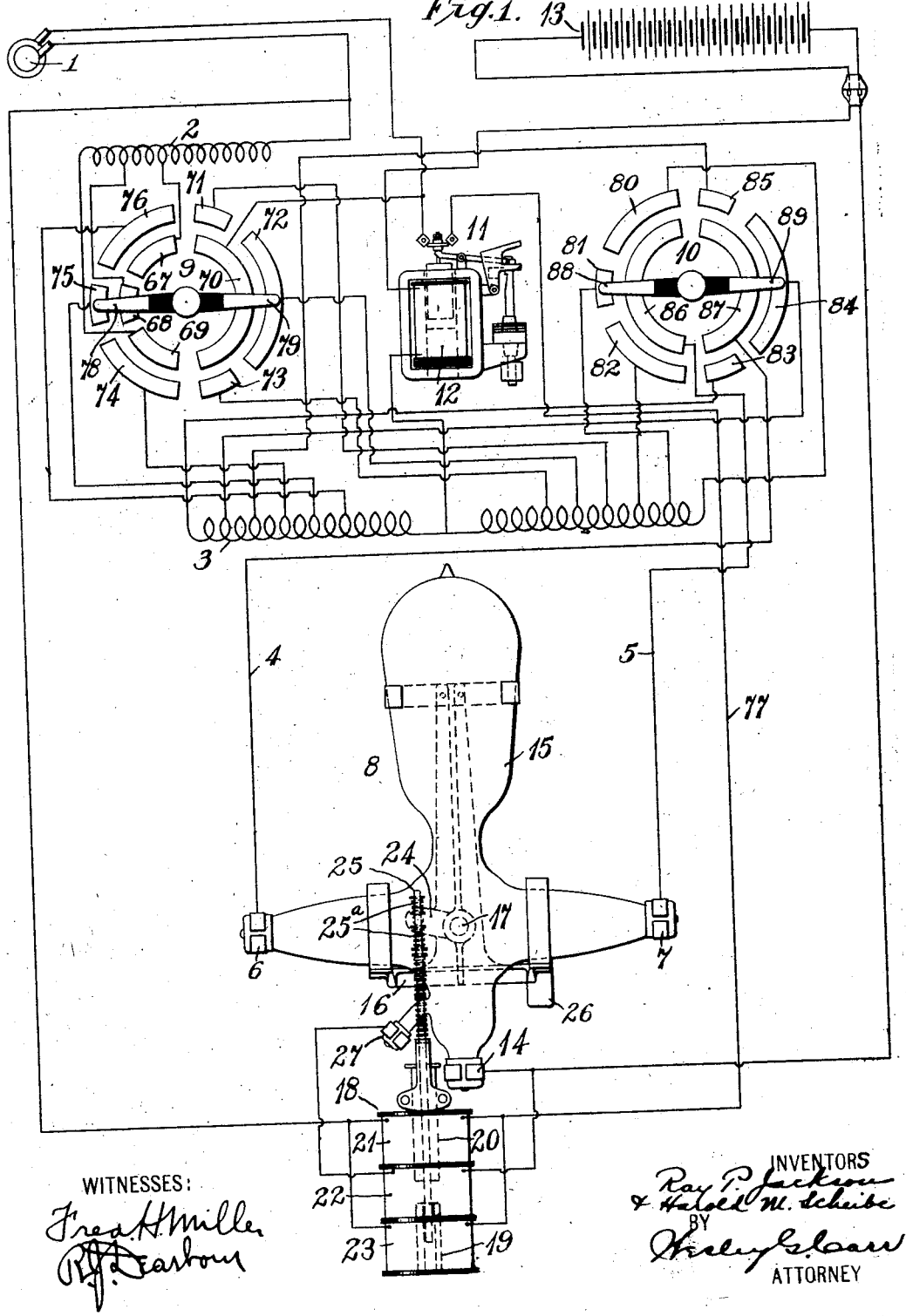
Figure 2:
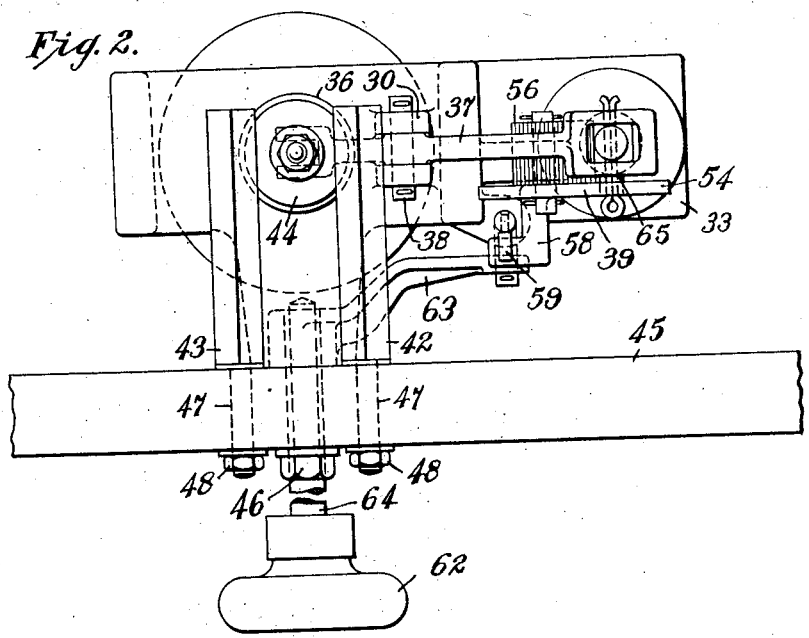
Figure 3:
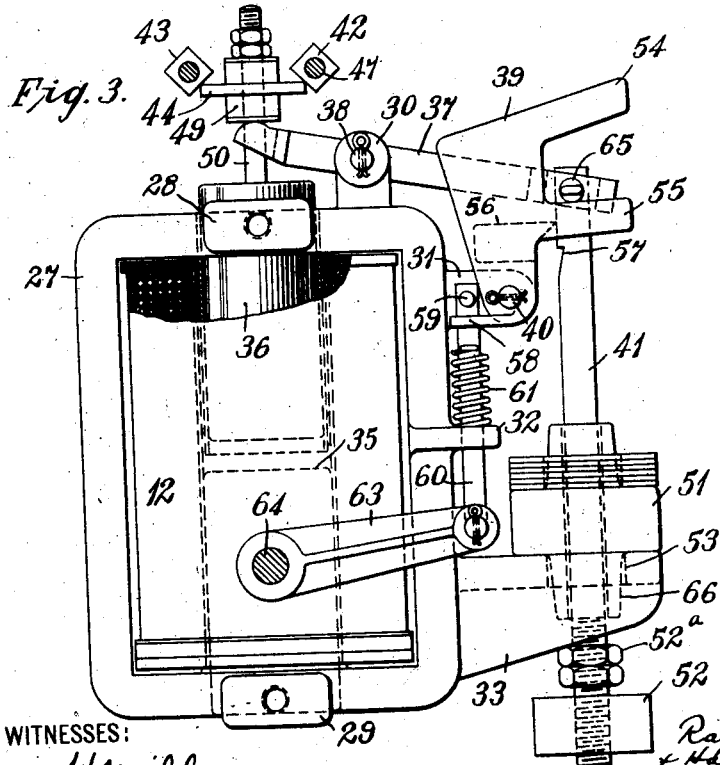

Figure 1 of the accompanying drawings is a diagrammatic view of a battery-charging system embodying our invention and Figs. 2 and 3 are, respectively, a plan view and a front elevation of a relay switch constructed in accordance with our invention.

Referring to Fig. 1 of the drawings, alternating current energy may be supplied from any suitable source, such as the generator 1, through a reactance 2, an auto transformer 3 and circuit conductors 4 and 5 to terminals 6 and 7 of the rectifying device 8. Regulating dials 9 and 10 are adapted to so vary the circuit connections of the auto transformer as to adjust the alternating current voltage impressed upon the rectifier. A relay switch 11 is introduced in a circuit conductor 77 which supplies energy for starting the rectifier and its coil 12 is connected in series with the direct current circuit of the rectifier, which may be connected to the terminals of the storage battery 13 or to some other suitable load, one terminal of the circuit being connected to the middle point in the auto transformer 3 and the other being connected to the direct current terminal 14 of the rectifier. The rectifier comprises a substantially cruciform bulb 15, a supporting frame 16 therefor which is pivotally mounted on a shaft 17, a starting or tilting magnet 18 having stationary and movable core members 19 and 20 and coils 21, 22 and 23. The frame 16 is provided with a crank projection 24 which is resiliently joined to the movable core member 19 by a rod 25 and springs 25ª, the arrangement of parts being such that when the magnet 18 is energized the rectifier will be so tilted in opposition to a counter-weight 26 that the mercury within the rectifier bulb will form a circuit connection between the direct current terminal of the rectifier and the starting terminal 27, in a well known manner.

Referring to Figs. 2 and 3 of the drawing, the relay switch, which is here illustrated, comprises a substantially rectangular magnetizable frame 27 having lugs 28 and 29 projecting laterally from its ends, ears 30 at its upper end and a lug 31 and brackets 32 and 33 at one side, stationary magnet coil 12, stationary and movable core members 35 and 36, a lever 37 fulcrumed on a shaft 38 that is supported by the ears 30, a latch member 39 pivotally supported by a pin 40 with which the lug 31 is provided, a weight-bearing rod 41 pivotally suspended from the outer end of the lever 37, stationary contact terminals 42 and 43 and a movable bridging contact member 44 that is operatively connected to the core member 36. The frame 27 is fastened to a plate or a slab 45 by bolts 46 which extend through the slab and are screw-threaded into the lugs 28 and 29. The stationary contact terminals 42 and 43 are provided with shank projections 47 which extend through the slab 45 and are screw-threaded to receive nuts 48. The inner end of the lever 37 is bifurcated and is adapted to engage a shoulder, formed by an insulating sleeve 49 by which the bridging contact member 44 is secured to and electrically separated from the stem 50 of the movable core member 36, the arrangement of parts being such that the attraction of gravity on weights 51 and 52, which are mounted on the rod 41, will close the relay switch when its magnet coil is deënergized. The bracket 33 is provided with a hole 53 through which the rod 41 extends, the weight 51 being loosely mounted on the rod above the bracket 33 and the weight 52 being secured to the lower end of the rod below the bracket. The latch member 39 is provided with two arms 54 and 55 disposed in a plane which is parallel to the rod 41, and with a lateral projection 56 having a sharp edge which is adapted to engage a notch 57 in the rod 41, and also with a projection 58 which is offset and may be engaged by a pin 59 that projects laterally from an actuating rod 60. The rod 60, which extends through a hole in the bracket 32 and is provided with a spring 61 to normally separate the pin 59 from the projection 58, is pivotally connected to an operating handle 62 by means of a lever 63, the handle 62 and lever 63 being secured to opposite ends of a shaft 64 which extends through the slab or plate 45.

The latch block 39 is mounted in unstable equilibrium and the arrangement of parts is such that an upward movement of the rod 41, which is produced by a predetermined energization of the coil 12, causes a finger projection 65, with which lever 37 is provided, to strike the arm 54 and thereby rotate the block in a counter-clockwise direction until it is overbalanced and falls against the frame 27 of the device. If, under these conditions, the magnet is deënergized, the weights 51 and 52 will close the relay switch and the downward movement of the rod 41 will cause the finger 65 to engage the arm 55 and actuate the block in a clockwise direction. This action, however, is so timed that the projection 56 does not engage the notch 57. If the magnet coil is then slightly energized, the rod 41 will be raised until a stop nut 52ª engages a projection 66 on the weight 51 and will then be stopped because the pull exerted by the magnet will be insufficient to raise both weights 51 and 52.

The notch 57 is so located on the rod 41 as to be engaged by the edge of the projection 56, under the aforesaid conditions, and it is then impossible for the relay switch to be closed unless the block 39 is released by a suitable adjustment of the handle 62 which imparts such a downward movement to the rod 60 that the pin 59 engages the offset projection 58, or unless the magnet coil 34 is again energized above a predetermined amount.

The dial 9 comprises a plurality of stationary contact ring segments 67 to 76, inclusive, which are engaged by a movable contact arm having two contact portions 78 and 79. This dial is arranged to adjust the circuit connections between the line conductors, the reactance 2 and the auto transformer 3, and is supplemented by the dial 10 by which voltage adjustment may be effected in smaller steps. The dial 10 comprises contact ring segments 80 to 87, inclusive, which are bridged by a contact arm having contact portions 88 and 89.

The rectifier, the dials, the relay and the auto transformer may constitute what is known as a battery-charging set for charging automobile batteries from lighting circuits which are supplied with alternating current energy. When used for purposes of this kind, the dials 9 and 10 may be so adjusted as to produce a direct current voltage slightly higher than the maximum voltage of the storage battery which is to be periodically charged from it. The battery may then be connected to the direct current circuit of the rectifier and the relay switch released, as referred to above, the automatic features of the system being relied upon to maintain the charging current on the battery until the counter-electromotive force reaches a predetermined value. After the dials 9 and 10 are once adjusted for charging a given battery, they need not be disturbed unless it is desired to vary the degree to which the battery is charged. The reactance 2 is so designed and regulated as to have a maximum effect in cutting down the direct current voltage when the battery is discharged and a minimum effect when the battery is nearly charged. By this means, the voltage applied to the battery is automatically regulated to give a rising voltage characteristic according to the best practice for battery charging.

The operation of the system is as follows: Assuming that the rectifying process is in operation, with the circuit connections as indicated in the diagram of Fig. 1, and that the storage battery is only partially charged; under these conditions, if the rectifying process is interrupted, for any reason, such as the interruption of the alternating current supply circuit, the relay switch will, of course, be closed by reason of the failure of the current traversing the direct current circuit of the rectifier and the deënergizing of the coil 12. An alternating current circuit will then be completed through the relay switch to the magnet coils 21 and 23 of the magnet 18, which will be followed by a tilting of the rectifier bulb. The mercury contained in the bulb completes a circuit connection between the terminals 14 and 27 of the rectifier and, by this means, the coil 22 will be short circuited, thereby choking down the magnetization across the air gap between the stationary and movable core members of the magnet and permitting the counter weight 26 to return the rectifier to its normal operating position. The short circuit referred to above will thus be interrupted and an electric arc produced, so that the alternating current voltage applied to the rectifier terminals may start the rectifying process in a well known manner. The action of the starting magnet will be repeated if the rectifier fails to start. As the battery is being charged, its counter-electromotive force will gradually oppose the direct current voltage of the rectifier more and more until the current traversing this circuit is so reduced that the rectifying process is discontinued and the relay switch closed. The rectifier will then be tilted in an attempt to start the rectifying process. This action will usually cause the process to restart and continue for a short time at a low current value, but, as soon as the relatively weak direct current is applied to the coil 12, the relay switch will be opened and the projection 56 of the block 39 will come into engagement with the notch 57 in the rod 41, as above indicated. When the bulb goes out again, no further action of the rectifier can take place until the block 39 is released by means of the handle 62.

It will, of course, be understood that structural modifications may be effected in the details of the relay and in the circuit connections of the system illustrated without departing from the spirit of our invention, and we desire that only such limitations shall be imposed as are indicated in the appended claims.

We claim as our invention:

1. A relay switch comprising a stationary frame, stationary and movable core members, an actuating coil for opening the switch, a lever operatively connected to the switch, means for opposing the final action of the magnet winding to a greater degree than the initial action of the magnet winding, and means dependent upon a slight energization of the coil for locking the switch in an intermediate open position.

2. A relay switch comprising a stationary frame, stationary and movable core members, a coil, a lever operatively connected to the switch, a weight suspended from one end of the lever which tends to close the switch, a second weight adapted to be picked up by the lever at a predetermined point in the switch movement, and means for locking the switch in an intermediate open position if the coil is only slightly energized.

3. A relay switch comprising a stationary frame, stationary and movable core members, a coil, a lever operatively connected to the switch, weights suspended from one end of the lever, a projection on the stationary frame for supporting one of the weights under predetermined conditions and means for locking the lever to prevent subsequent closure of the switch when it is opened by a relatively small current applied to the magnet winding.

4. A relay switch comprising a stationary frame, stationary and movable core members, and an opening magnet, mechanical means for holding the switch closed and means dependent upon a slight energization of the coil for locking the switch in an intermediate open position.

5. A relay switch comprising a stationary frame, stationary and movable core members, an opening coil, a lever pivotally mounted on the stationary frame and operatively connected to the movable member of the switch, weights suspended from the lever and a pawl for locking the lever in an intermediate position when the magnet coil is energized to a slight degree.

6. A relay switch comprising a stationary frame, stationary and movable core members, an opening coil, a lever pivotally mounted on the stationary frame and operatively connected to the movable member of the switch, weights suspended from the lever and a device for locking the lever in an intermediate position when the magnet coil is energized to a slight degree, and manually operated means for releasing said device.

7. In a system of distribution, the combination with an alternating current supply circuit, a vapor rectifying device connected thereto and electro-responsive starting means therefor, of a relay switch interposed in the circuit of the starting means, and means for automatically closing the relay switch upon the interruption of the rectifying process except when the interruption is preceded by a starting of the process under low current conditions.

8. In a system of distribution, the combination with an alternating current supply circuit, a storage battery, a vapor rectifier interposed between said circuit and said battery and a starting device for the rectifier, of a relay switch interposed in the circuit of the starting magnet, mechanical means for closing the switch, an electro-magnet which is dependent upon the continuance of current traversing the direct current circuit of the rectifier for holding the relay switch open and a device for locking the switch in an open position if the rectifying process is commenced at a low current value after being temporarily interrupted.

9. In a system of distribution, the combination with an alternating current supply circuit, a storage battery, a vapor rectifier interposed between said circuit and said battery and a starting device for the rectifier, of a relay switch interposed in the circuit of the starting device having an opening magnet energized by the direct current circuit of the rectifier, and means for automatically closing the relay switch upon an interruption of the rectifying process except when such interruption follows a starting of the rectifying process under a predetermined low value of current in the direct current circuit.

10. In a battery charging system, the combination with an alternating current supply circuit, a vapor rectifier having electro-responsive starting means and a storage battery, of a relay switch comprising mechanical means for closing the switch, an electromagnet for opening the switch and a device for locking the switch in an open position, said magnet being energized from the charging circuit, and said starting means being dependent upon the relay switch.

11. In a battery-charging system, the combination with an alternating current supply circuit, a vapor rectifier and a storage battery, of a starting means for the rectifier and means dependent upon an interruption of the charging current for starting the rectifying process, and dependent upon the starting of the process under an abnormally weak charging current for preventing the restarting of the rectifying process.

12. A relay switch comprising a stationary frame, stationary and movable core members, an opening coil, a lever pivotally mounted on the stationary frame and operatively connected to the movable member of the switch, weights suspended from the lever and a latch for locking the movable contact member in an intermediate position when the energization of the magnet coil is within certain limits.

In testimony whereof, we have hereunto subscribed our names this 13th day of January, 1909.

RAY P. JACKSON.
HAROLD M. SCHEIBE.

Witnesses:
HAROLD B. TAYLOR,
BIRNEY HINES.